United States Patent [19]
Van Winckel

[11] Patent Number: 4,924,935
[45] Date of Patent: May 15, 1990

[54] THERMAL ENERGY STORAGE CONTAINER SYSTEM

[76] Inventor: Walter Van Winckel, 75 Quaker Hill Rd., Monroe, N.Y. 10950

[21] Appl. No.: 261,889

[22] Filed: Oct. 25, 1988

[51] Int. Cl.⁵ .............................................. F28D 20/00
[52] U.S. Cl. ...................................... 165/10; 165/13; 165/104.11; 62/59; 62/430; 62/434
[58] Field of Search ...................... 165/10, 104.11, 13; 62/59, 430, 434

[56] References Cited

U.S. PATENT DOCUMENTS

| | | | |
|---|---|---|---|
| 3,773,031 | 11/1973 | Laing et al. | 126/400 |
| 3,960,207 | 6/1976 | Boer | 126/400 |
| 4,114,600 | 9/1978 | Newton | 126/271 |
| 4,248,291 | 2/1981 | Jarmul | 165/4 |
| 4,347,892 | 9/1982 | Clyne et al. | 165/10 |
| 4,393,918 | 7/1983 | Patry | 165/10 |
| 4,556,100 | 12/1985 | Whitman | 165/10 |
| 4,565,242 | 1/1986 | Yano et al. | 165/10 |
| 4,612,974 | 9/1986 | Yanaduri et al. | 165/10 |
| 4,709,750 | 12/1987 | White | 165/10 |
| 4,753,080 | 6/1988 | Jones et al. | 62/59 |
| 4,793,402 | 12/1988 | Yano et al. | 165/1 D |
| 4,856,296 | 8/1989 | Shu | 162/430 |

FOREIGN PATENT DOCUMENTS

| | | | |
|---|---|---|---|
| 3332823 | 3/1985 | Fed. Rep. of Germany | 62/529 |
| 74590 | 5/1982 | Japan | 165/10 |
| 15793 | 1/1984 | Japan | 165/10 |
| 41793 | 3/1984 | Japan | 165/10 |
| 243284 | 10/1986 | Japan | 165/10 |

OTHER PUBLICATIONS

Heating/Piping/Air Conditioning Aug., 1988 p. 53.
Reaction Thermal Systems Inc. (Flyer).
Heating/Piping/Air Conditioning Aug., 1988 p. 23.

Primary Examiner—Albert W. Davis, Jr.
Attorney, Agent, or Firm—Harry Williams

[57] ABSTRACT

A plurality of generally rectangular PCM (phase-change material) containers for use in a TES (thermal energy storage) system wherein each container is shaped to lock-support at least one pair of superimposed adjacent containers so that each row of containers is offset from each other. In one embodiment each container is cross-sectioned in the general shape of a bow tie or an hour glass so that there is a recessed or depressed portion in the top and the bottom of the container running the full length thereof. Further, the top and bottom surface material of each container is shaped in the form of an undulating wave pattern that extends in the longitudinal direction parallel to the long axes of the aforementioned depressed portions, and the node portions of which are provided with grooves or flow channels which extend in a lateral dimension, normal to the long axes, so as to circumscribe the container. These grooves not only provide flow channels for the heat transfer fluid, but they also allow each container to expand or contract with the PCM when the latter is changing state. In another embodiment the containers are generally flat and are intended to be supportive of one another in a vertically stacked array; channels or recesses are provided in the sidewalls to allow for expansion and contraction in a vertical direction. Also provided is a conduit seal system and a liquid level control for improving the efficiency of the thermal transfer fluid used with the containers in the TES tank.

20 Claims, 4 Drawing Sheets

U.S. Patent    May 15, 1990    Sheet 1 of 4    4,924,935
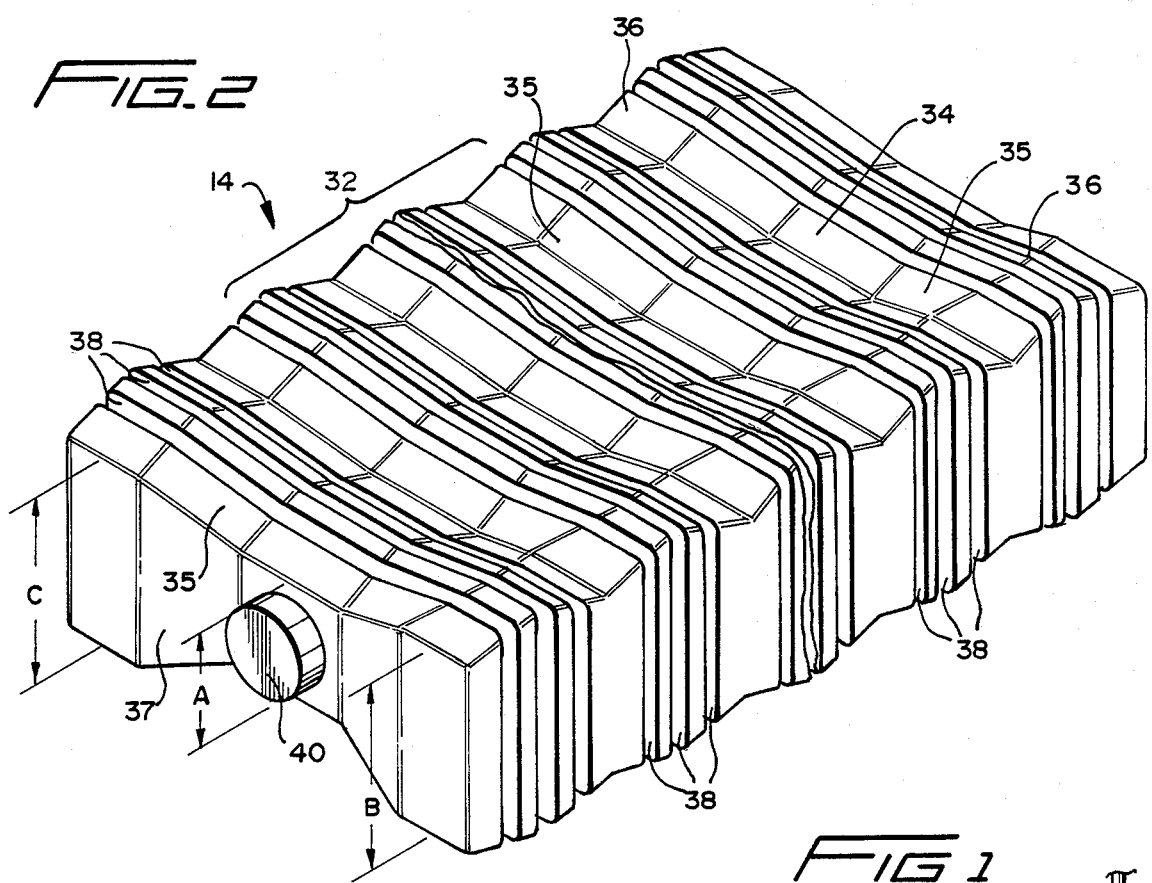
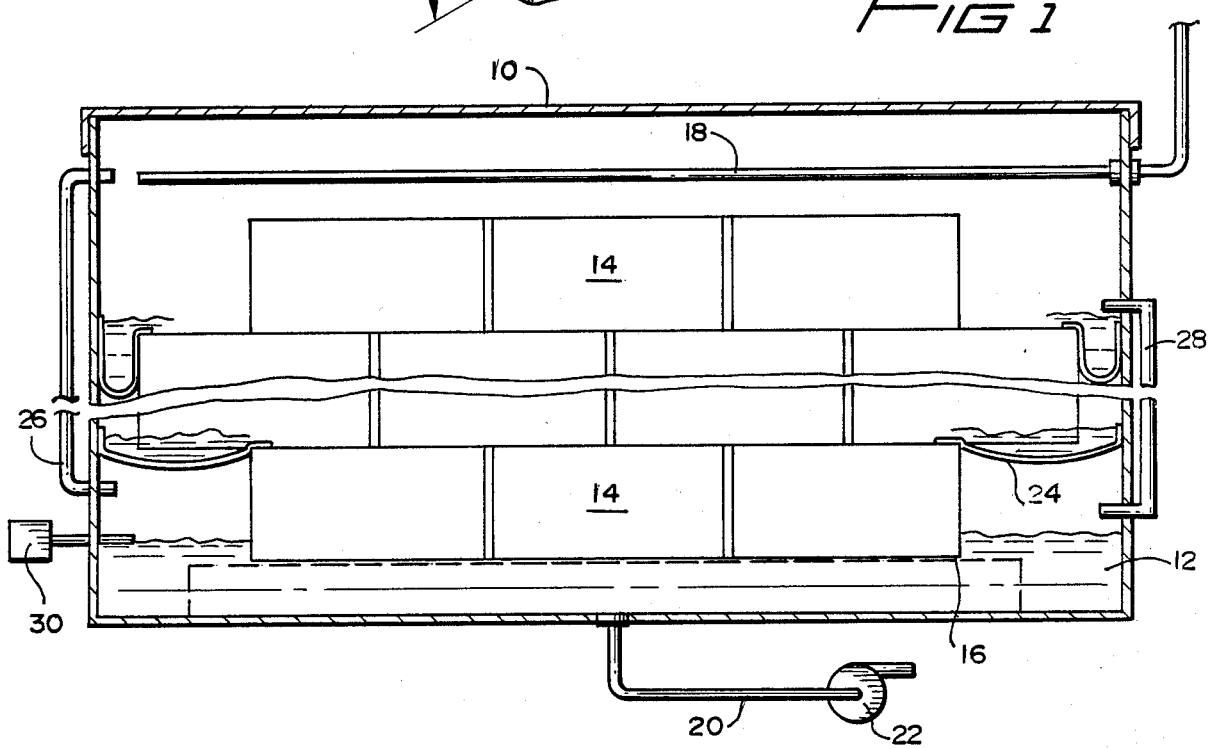

THERMAL ENERGY STORAGE CONTAINER SYSTEM

BACKGROUND OF THE INVENTION

The present invention is in the field of phase-change thermal energy storage (TES) and is specifically directed to a system in which a plurality of containers each containing a phase-change material (PCM), that is, a latent heat accumulating fluid, are arranged in a tank in a unique self-supporting manner that allows the associated thermal transfer fluid to operate at a high volumetric efficiency.

Thermal energy storage (TES) is a well-known technology for cooling buildings during daytime on-peak periods when the cost of maintaining the primary modes of cooling are at their highest. In order to cut these high-energy costs during peak periods, thermal energy can be stored during off-peak or low-demand periods and then used during the peak, high-cost periods. During off-peak periods (nighttime, for example) a coolant, a readily available building coolant, for example, is circulated around the storage system at below freezing temperatures in order to freeze the liquid contained in the containers. The ice formed in the containers is thus stored, and the containers are subsequently exposed to a thermal transfer fluid for providing low-cost refrigeration during a peak daytime period. Such storage systems normally employ a number of different methods to effect thermal storage. For example, one such method is to circulate a readily available building coolant through a number of pipes positioned within a liquid-filled tank to cause ice-formation on the exterior of the pipes. The liquid in the tank becomes cooled and then can be used as a thermal transfer fluid as needed. This method, however, requires extensive monitoring equipment to insure that the ice-build up around the pipes does not become unmanagable. In another method, plate-ice is formed by spraying water on plate coils which are alternately cooled to form ice and warmed to release the ice which is stored in a liquid-filled tank. This method requires an elaborate cooling and heating mechanism as well as additional storage facilities apart from the ice-formation facility.

In yet another method, to which the present invention relates, semi-rigid containers having a phase-change medium (PCM) therein are stored in a tank. In one such system a gas fluid, such as air, operates as a thermal transfer fluid and is circulated around the stacked containers which have stand-off projections cast intergrally thereon to allow the fluid to flow between them. Each container in this system is filled with a PCM, such as water, or a latent heat storage material, such as polyethelene glycol or calcium chloride hexahydrate. In this particular system stand-off projections on the individual containers can serve to both support the superimposed containers and create, as well, the flow-through paths between the top and bottom surfaces of the containers. While this arrangement may be effective for a gas thermal transfer fluid, such as air, it is ineffective for a liquid fluid which is used as a thermal transfer medium. Also, a gas thermal transfer fluid has low specific heat and density and is therefore a poor thermal transfer medium. In liquid TES systems using stacked containers, support structures, such as rods and shelves are normally employed to support the stacked containers in the tank. This additional support structure, often constructed of metal and subject to corrosion, becomes an unwanted obstacle then, to the economic use of space. Additonally, the containers presently used are only partially filled with a PCM in order to allow for expansion of the liquid within the container. Often, in such thermal storage systems the PCM occupies 30 to 65% of the system's volume, and for that reason inefficiently low refrigeration temperatures are needed to form ice in the containers.

There is a need, therefore, to provide a TES system which uses a liquid thermal transfer fluid in a tank that can operate with increased volumetric efficiency, improved thermal transfer, efficent use of space, and which makes use of an efficient individual container design for storing a PCM.

OBJECTS AND SUMMARY OF THE INVENTION

It is the primary purpose and principle object of the present invention to address the aforementioned needs and provide, therefore, a thermal engergy storage (TES) system for refrigeration in which a unique container design allows for a plurality of such containers to be stacked in a self-supporting manner and in which the thermal transfer fluid associated with the TES system is allowed to flow around the tops and sides of the containers in a controlled flow-through manner and operates, therefore, at a high volumetric efficiency (increased ice per cubic foot of ice storage). Further, such containers, according to the invention, exhibit a large surface-to-volume ratio which enhances rapid freeze and thaw cycles therein that can meet heavy load demands. Also, the containers according to the invention can be completely filled with a phase-change material (PCM), thereby enhancing their thermal conductivity as well as their structural strength. Additonally, the containers according to the invention can expand and contract as the PCM changes phase without altering their self-supporting arrangement or without affecting the flow of thermal transfer fluid around the containers.

The present invention has for its ancilliary objects and purposes the prevention of floating of the containers in the tank, obviating the need for a restraining device to anchor the containers within the tank, reducing heat transfer from the container-array through the liquid and the sidewalls of the tank, and reducing the amount and weight of coolant or heat transfer liquid used in the system. Additionally, the tank according to the present invention prevents wasteful channeling of the coolant or heat transfer fluid down the sides of the tank, prevents convection currents in the fluid from materializing, and reduces heat gain through the walls of the tank.

According to the principles of the invention there is provided a a plurality of generally rectangular PCM containers wherein each container is shaped to lock-support a superimposed pair of adjacent containers so that each row of containers is offset from each adjacent row of containers. More specifically, each container, according to the invention, is cross-sectioned in the general shape of a bow tie or an hour glass so that there is, then, a recessed or depressed portion in the top and the bottom of the container running the full length thereof. At one end of the container there is a recessed spout and cap for receiving the PCM. Further, the top and bottom surface material of each container is shaped in the form of an undulating wave pattern that extends in the longitudinal direction parallel to the long axes of the aforementioned depressed portions, and the node portions of which are provided with grooves or flow channels which extend in a lateral dimension, normal to the long axes, so as to circumscribe the container. These grooves not only provide flow channels for the heat transfer fluid, but they also allow each container to expand or contract with the PCM when the latter is changing state. With such a design it will be understood that the grooves on the hill or node portions of one container will lie adjacent the ungrooved valley portions of an adjacent container. In this way the flow channels for the heat transfer fluid will always remain unobstructed no matter what configuration the containers as a whole assume, that is, whether the same are expanding or contracting.

Further, according to the principles of the invention, there is provided a TES tank structure for housing the above-described containers in which one or more diaphragm lips are secured to the interior sidewalls of the tank and connnect with the periphery of the stacked container structure. In this way a seal-like conduit surrounds the container structure and diverts the heat transfer liquid away from the sidewalls of the tank towards the containers themselves occupying the interior portion of the tank. Additionally, a liquid level control feature restricts the amount of heat transfer liquid in the tank so that the containers do not float because of excessive liquid in the tank; such liquid level control further reduces the amount and weight of the liquid used and serves to reduce the amount of heat gain through the liquid itself and the walls of the tank, air being a much better insulator than liquid.

The invention will be better understood and further objects and advantages thereof will become more apparent from the ensuing detailed description of the preferred embodiments taking in conjunction with the drawings.

BRIEF DESCRIPTION OF THE DRAWINGS

FIG. 1 is schematic elevation view in partial cross-section of the TES tank system according to the principles of the invention;

FIG. 2 is a schematic perspective view of one of the containers constructed according to the principles of the invention which is used in the TES system shown in FIG. 1;

DETAILED DESCRIPTION OF THE INVENTION

Figure 7:
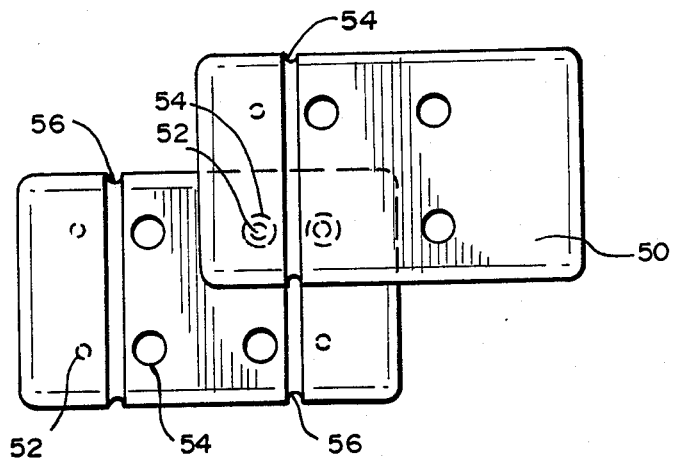
FIG. 7 is a schematic plan view of a further embodiment of the container shown in FIG. 2.

Referring now to FIG. 1 there is shown a thermal energy storage (TES) tank 10 in which has been subjected to a circulating coolant, that is, a thermal transfer fluid 12 which is used in an external refrigeration system, not shown. Such coolants are well known in the art and are usually comprised of a brine or an ethylene glycol-water mixture which is chilled by the refrigerant (Freon, ammonia or other refrigerant) in an external heat-exchanger evaporator. Occupying a major portion of the interior of the tank is a plurality of stacked individual containers 14, the construction of which will be discussed shortly. The stacked containers may be supported by a grating structure 16 disposed near the bottom of the tank, or, on the other hand, an external support for the containers can be dispensed with if the bottom wall of tank 10 is provided with suitable channels situated below the stacked array of containers. The transfer fluid can then flow to a level below the stacked array of containers and thus out of the tank through these channels. Such channels, not shown, can be created in place when a tank 10 is constructed from concrete at a suitable building site, that is, constructed when the building itself for which it will be used is also constructed. Disposed above the stacked array of containers is a feed-pipe 18 for introducing the thermal transfer fluid 12 into the tank. The pipe 18 is shown to be extended across the stacked array of containers for the purpose of evenly distributing the liquid 12 over the stacked array. Spaced holes along the pipe, not shown, may be provided for this purpose. At the bottom of the tank is shown an exit pipe 20 which is provided with a suitable pump 22 for removing the liquid 12 from the bottom of the tank. A flexible diaphragm member 24 is shown connected between the interior walls of the tank and the stacked array of containers. This diaphragm member or conduit seal may be positioned at any level within the tank, such as positioned near the bottom of the tank, as shown, or, alternatively, positioned both near the middle and the bottom, as well as at other levels in the tank. The conduit seal is affixed to the interior walls of the tank by a suitable fastening means, such as an adhesive or bolt means and is designed to have its interior edge or lip portion rest on the edge of a particular row of the stacked array of containers with enough free play to allow the containers to expand or contract without effecting the operation of the seal so that the conduit seal completely surrounds the stacked array. Again, a suitable fastening means can be used, which in this case would have to be an adhesive, or the conduit seal may be inserted between two rows of containers and held there by the weight of the containers themselves. The function of the conduit seals 24 will be more fully explained below. Also shown is a pressure release pipe 26, to be more fully discussed below, and liquid level control devices 28 and 30, also to be more fully discussed below.

In FIG. 2 is shown the detailed contruction of the container 14 used in the stacked arrangement shown in FIG. 1. The container itself is preferrably molded from a plastic material, such as copolymers, incluidng polyethylene and polypropylene, or any material that exhibits low vapor transmission, good heat transmission, abrasion resistance, toughness, puncture resistance and slipperiness. It is contemplated that a metal substance might be used in addition to plastic, or that a plastic composition be used which includes metal particles or particles of other materials for enhancing the thermal conductivity of the plastic. In any case each container 14 preferably holds approximately a gallon of a phase-change material (PCM) which is well known in the art and may be water or other liquid. One gallon sizes for the containers have proved to be the most useful from the point of view of economy and strength; however, sizes of less volume, a quarter of a gallon, say, or of greater volume, ten gallons, say, could be employed. As shown, the container 14 is generally rectangular in shape with the corners rounded to increase volume-to-surface ratio and is provided with an undulating wave pattern 32 along the top and bottom walls. The sidewalls are kept relatively flat. A central portion 34 is shown to have a lesser volume than that of either of the peripheral portions 36. A sloped transition portion 35 connects the peripheral and central portions. This disparity in size between the different portions of the container gives the container a "bow tie" cross-section. Thus, it will be seen from the drawing that the dimension 'A' which measures the top and bottom of the container for the central portion 34 is less than either of the dimensions 'B' and 'C' which measure, respectively, each of the peripheral portions of the container. This particular shape has two important functions; it allows for the containers to be locked in place when stacked together (see FIG. 3), and it also enhances efficiency of thermal transfer from the center of the container to the exterior walls by reducing the interior volume at the center and hence increasing the surface-to-volume ratio. Also shown are flow channels 38 surrounding the container and extending in a direction normal to the extension of the undulation wave pattern 32. The channels 38 also serve two functions; they allow the thermal transfer fluid 12 to circulate around the container unobstructedly because they occupy either the exterior node portions, as shown, or the interior node portions of the undulating wave pattern 32 (see FIG. 5), and they allow the container, therefore, to expand and contract as the PCM alters its state due to a change in thermal conditions. The container 14, then, expands and contracts in an accordian-like fashion because of the specific arrangement of the channels 38. For this reason, as well, the containers according to the present invention can be completely filled with a PCM, thereby maximizing thermal conductivity and obviating the need to transfer thermal energy through highly insular air-pocket formations that result from partially filled containers. Finally, the container is seen to have an access opening in one of its endwalls for the purpose of introducing the PCM. A suitable twist-off cap 40 is provided, and the cap is seen to be recessed within the endwall of the container by virtue of the sloped portions 37, as shown. In this way, further channeling is created in the endwalls when the containers are juxtaposed on the same row, thereby allowing flow of the transfer liquid 12 down the endwalls, as well as the sidewalls.

Figure 3:
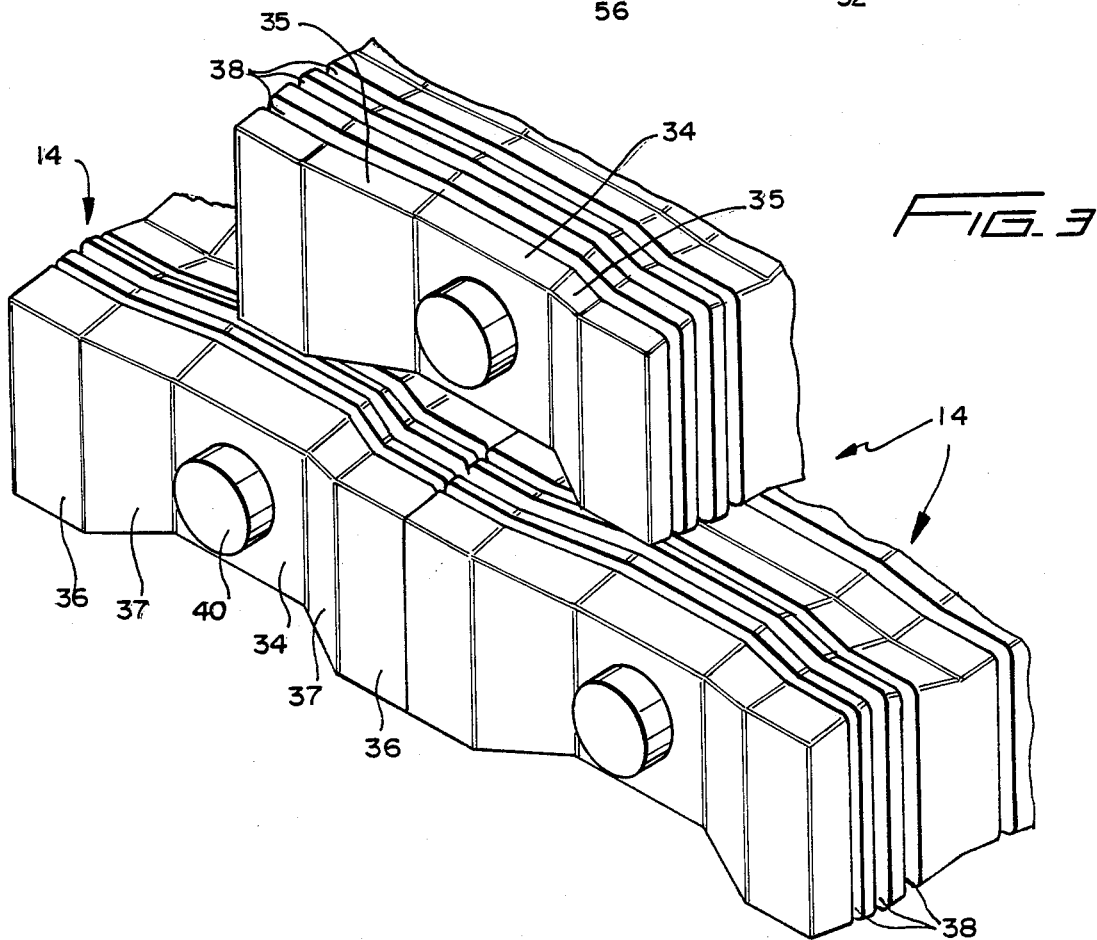
FIG. 3 is a schematic perspective view showing the container of FIG. 2 in a stacked arrangement with other containers according to the invention.

FIG. 3 shows more clearly the stacked arrangement of the containers 14. It will be seen that two juxtaposed peripheral portions 36 of a pair of containers occupy either bottom (as shown) or the top central portion 34 of either an underlying or overlying container. In this way the containers are locked together, but at the same time, owing to the channels 38, they are free to expand or contract in their respective locked positions. Also the channels 38 maintain an unobstructed flow of the thermal transfer fluid 12, regardless of whether the containers are in an expanded or contracted condition. Flow along the top walls of the containers in an endwise direction normal to the channel direction is facilitated by the viscosity of the transfer fluid itself as well as the volume of fluid flowing in the channels which will act to separate, if only slightly, the superimposed containers one from the other and thereby create endwise flow between the containers. In this way a controlled and continuous flow of the thermal transfer fluid around the containers is insured as opposed to a haphazard random type of flow, the former being more effective to exact a more efficient thermal transfer between the PCM in the containers and the transfer fluid than would otherwise be available with a random or interrupted flow pattern.

Figure 4:
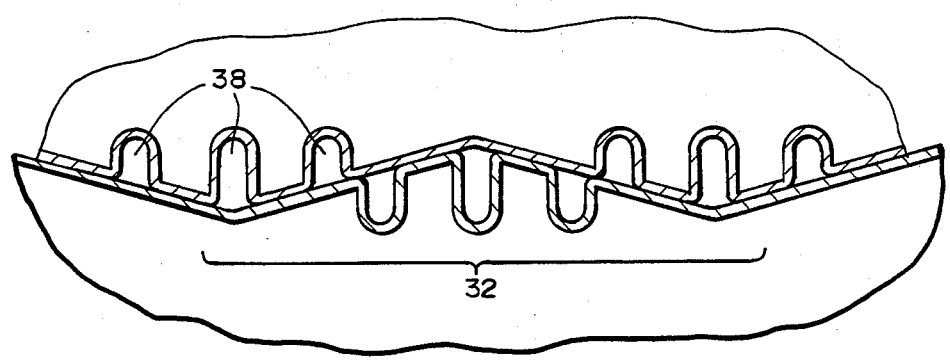
FIG. 4 is a schematic cross-sectional view of the channel arrangement shown in FIG. 3.

FIG. 4 shows a detailed view of how the two juxtaposed containers interact to provide unobstructed channel flow. The dimensions of the wall surfaces, channels and wave patterns have been exaggerated to show the relationship between the channels 38 and the wave pattern 32. Because the channels 32 occupy only the external node portions in this case of the wave pattern 32, the channels of the one container are always offset from the channels of the other container, thereby insuring free and open channels. Naturally, the same function occurs when the channels 38 occupy only the internal node portions of the wave pattern 32.

Figure 5:
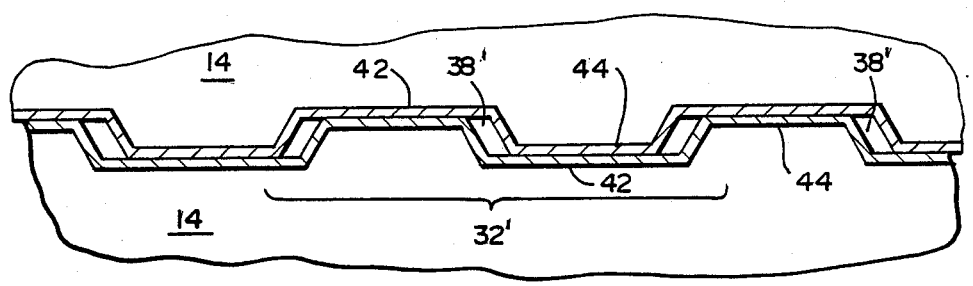
FIG. 5 is a schematic cross-sectional view of a further embodiment of the container shown in FIG. 2 showing how flow channels are created by an irregular undulating wave pattern.

In FIG. 5 is shown an alternate embodiment to that shown in FIG. 5. Here the wave pattern 32'itself is not of a regular periodicity. Rather, it is defined by an irregular period; that is, each full wave pattern is asymmetrical about the central cross-over point, the one halfwave 42 being larger (or smaller) than the other halfwave 44. Thus when two containers 14 are juxtaposed, the wave patterns of both intermesh to create channels 38', as shown, which operate similarly to the channels 38 in providing flow of the transfer fluid around the containers.

Figure 6:
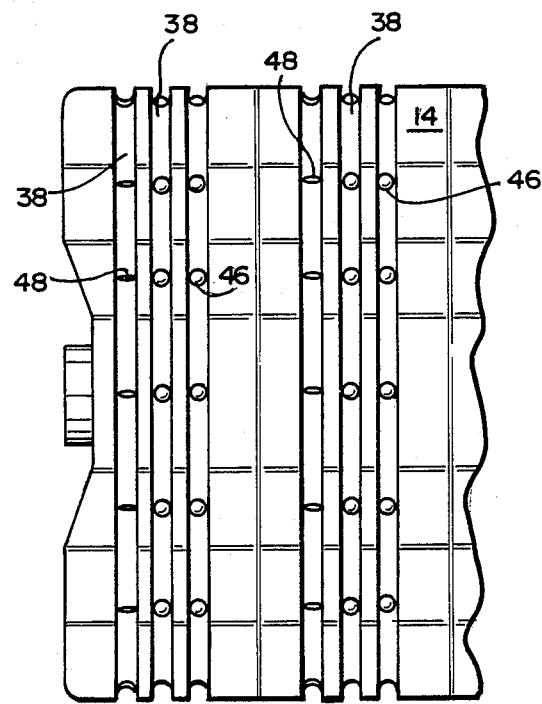
FIG. 6 is schematic plan view of the container shown in FIG. 2 further illustrating the use of protuberances in the channels for creating flow turbulence.
Figure 10:
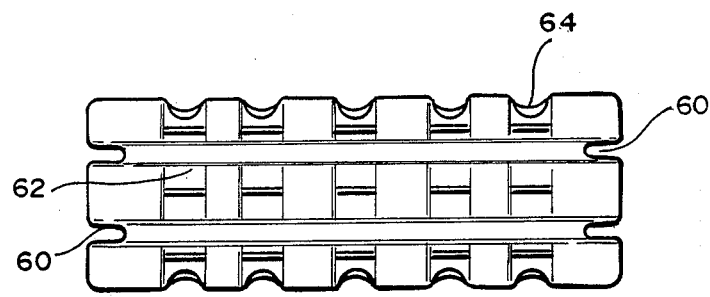
FIG. 10 is a schematic elevational view of the container shown in FIG. 9.

FIG. 6 shows the channels 38 in the container to be additionally provided with protuberances such as 46 and 48 which help to create a turbulent flow within the channels themselves, thus enhancing the heat exchange function of the thermal transfer fluid 12 as it circulates through the channels 38.

Figure 8:
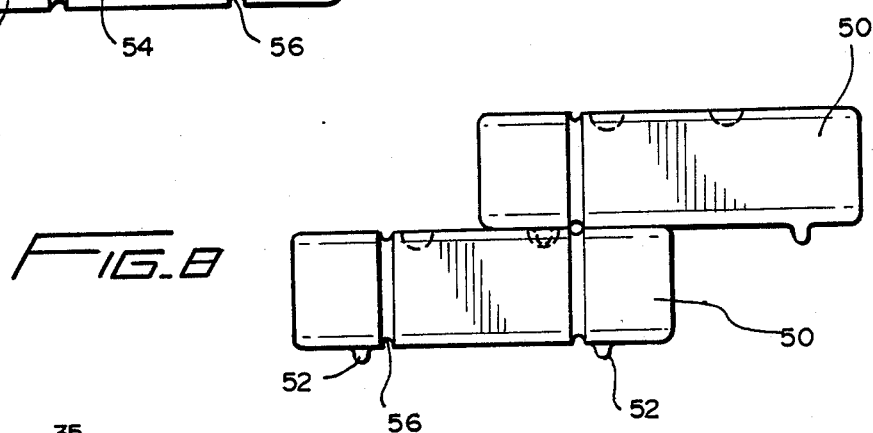
FIG. 8 is a schematic elevational view of the container shown in FIG. 7.

FIG. 7 shows a further embodiment of the container shown in FIG. 2. Here the container 50 is again generally rectangular, although a large horizontal dimension in relation to a small vertical dimension is favored for enhancing easy stacking. To enable the containers to be locked together stud members 52 are provided on the bottom wall of the container which fit into sockets or recesses 54 provided in corresponding locations on the top wall of the container, that is, a generally square configuration of either studs 52 or sockets 54, as shown. The sockets 54 are larger in diameter than the diameter of the studs 52 to thereby insure a loose fit between them which will enhance fluid flow around the studs and allow, as well, for lost motion during expansion and contraction of the containers. Flow channels 56 are provided, as shown, and run outside of and adjacent to the studs and sockets so that the channels 56 themselves will be aligned one with the other when the containers 50 are superimposed, as shown in FIG. 8.

Figure 9:
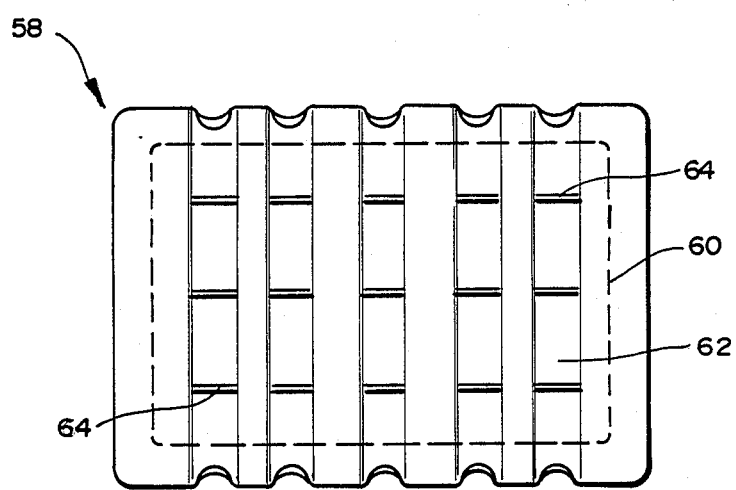
FIG. 9 is a schematic plan view of yet a further embodiment of the container shown in FIG. 2.

A still further embodiment is shown in FIG. 9. Here the container 58 is again generally rectangular, and, similar to the embodiment of FIG. 7, features a large horizontal dimension in relation to a small vertical dimension for the purpose of enhancing stacking of the containers one on top of the other but without, in this case, any positive locking engagement. In this case the large horizontal dimension gives the containers 58 an almost pancake-like stability that will enhance their vertical stacking and allow, as well, for a fully contiguous support between the top and bottom walls of superimposed containers. A pair of parallel recesses 60 are shown extending around the periphery of the sidewalls of the container. These channels or recesses allow the container to expand or contract in a vertical direction so as not to significantly disturb the contiguity between the top and bottom walls of superimposed containers. Extending around the top and bottom walls of the container 60 are a series of parallel flow channels 62 for the transfer fluid to run in, as in the previous embodiments. To provide a reinforcing strength to the container where the flow channels 62 are disposed, ribs 64 are also provided. These ribs also serve to generate turbulent flow of the transfer fluid, as in the case of the protuberances 46, 48 shown in FIG. 6. Unlike the previous embodiments of the container according to the invention, the containers 58 are not intended to be stacked in an offset relationship, such as shown in FIGS. 3 and 8; rather, the containers 58 are intended to be stacked randomly, there being enough flow channels 62 in each of the containers to insure circulation of the transfer fluid around the outside of the stacked containers.

Returning now to FIG. 1, the operation of the TES tank system according to the invention is as follows. The containers 14 are stacked together as above described in a self-supporting manner, as shown. A coolant is introduced via the pipe 18 and this refrigerant makes its way down the stack of containers in the manner described above (see FIGS. 4A and 4B) to the bottom of the tank 10. Because of the PCM contained in the containers 14, thermal energy is stored in the well known manner, which energy may be later used via a thermal transfer fluid 12 subsequently introduced via the pipe 18. With the subsequent introduction of the transfer fluid 12, circulation of the fluid through the stacked array of containers 14 again takes place. In order to keep the fluid or liquid away from the sidewalls and thereby avoid needless heat loss, the conduit seal members 24, as previously described, divert the liquid 12 towards the stacked array of containers and thus prevent the liquid 12 from sluicing down the sidewalls of the tank. Since air pressure may build up beneath the seal members 24 (whether using one or multiple members), a pressure release means is needed, and this is accomplished either through the provision of a vent pipe 26, as shown, or by means of suitable holes in the seal members themselves, not shown. Also, it has been found that by controlling the liquid level in the tank, the thermal efficiency of the TES system is increased. Thus, space between the sidewalls and the stacked array of containers can be maintained as an insulation against heat loss. In one example the liquid level may be kept under control to a level just above the conduit seal members so that liquid build-up between the stacked array and the sidewalls is prevented. For this purpose a liquid level control device 30 is provided just above a conduit seal, as shown, and senses liquid level in a conventional, well known manner to thereby control the flow of liquid into the tank depending on the sensed level in the tank. Such liquid level control devices 30 can be positioned any height in the tank to thereby monitor the liquid level above any one of a number of conduit seals. Alternatively, a simple inexpensive liquid level control can be installed in the form of a flow pipe 28 that would transfer excess liquid from above a conduit seal to a lower portion of the tank, as shown.

The foregoing relates to preferred exemplary embodiments of the present invention, it being understood that other embodiments and variants thereof are possible within the scope of the invention, the latter being defined by the appended claims.

What is claimed and desired to be secured by Letters Patent of the United States is:

1. A thermal energy storage (TES) system, comprising a self-supporting stacked array of containers having a PCM medium therein, each of said containers being a generally rectilinear structure, channel means on said containers for facilitating the flow of a thermal transfer fluid around the outside surface of said containers, said containers each having a locking means thereon for cooperating with adjacent locking means on at least one pair of superimposed containers, whereby said containers of said stacked array are substantially locked in place with respect to one another.

2. A TES system according to claim 1, wherein said locking means comprises a central portion whose dimension in a given direction is less than each of the respective dimensions of opposed peripheral portions of each of said containers for said given direction, and said central portion having surface means for supporting an adjacent pair of said peripheral portions of a pair of superimposed containers.

3. In a TES system according to claim 2, wherein said generally rectilinear structure comprises a pair of sidewalls and top and bottom walls, said central portion being confined to said top and bottom walls, and said top and bottom walls defining a surface having an undulating wave pattern extending in the direction of a given axis for said containers.

4. An array of containers according to claim 3, wherein said channel means extends in a generally normal direction to said given axis.

5. In a TES system according to claim 4, wherein said channel means occupies the node portions of said undulating wave pattern in said top and bottom walls.

6. In a TES system according to claim 2, wherein said central portion forms a depression in respective ones of said top and bottom walls.

7. In a TES system according to claim 1, wherein said locking means comprises a plug and socket means, one wall of said each container having a socket means, and another wall of said each container having a plug means, whereby said plug means fits into said socket means when said containers are superimposed.

8. In a TES system according to claim 7, wherein said channel means for said each container are in alignment with said channel means of said superimposed containers.

9. A thermal energy storage (TES) system, comprising a container having a PCM therein and being of a generally rectilinear shape having sidewalls and top and bottom walls, at least two of said walls defining a container expansion means, and at least another two of said walls defining a thermal flow channel means, said expansion means and said flow channel means contacting one another in at least one of said walls.

10. A TES system according to claim 9, wherein said container expansion means comprises channels extending around one peripheral direction of said container, and said flow channel means extending around another peripheral direction of said container generally normal to said one peripheral direction.

11. A TES system according to claim 9, wherein said container is composed of a plastic material from the group including copolymers, such as polypropylene and polyethylene.

12. A TES system according to claim 11, wherein said plastic material includes thermally conductive particles contained therein to enhance thermal conductivity.

13. A thermal energy storage (TES) system, comprising a container having a PCM therein and being a generally rectilinear structure having a pair of sidewalls and top and bottom walls, at least two of said walls defining a surface having an undulating wave pattern therein whose periodicity is irregular, and said undulating wave pattern extending in a direction parallel to a given axis for said container.

14. A TES system according to claim 13, further comprising an interior access means having a closure means thereon, and said access and said closure means disposed within a depressed portion of said container.

15. A TES system according to claim 13, wherein said container further comprises a central portion being confined to said top and bottom walls, and said central portion forming a depression in respective ones of said top and bottom walls.

16. A TES tank system comprising a stacked array of containers occupying a central portion of said tank, means for supporting said stacked array of containers near the bottom of said tank, each of said containers having a PCM medium therein, means for introducing a thermal transfer liquid into said tank above said stacked array of containers, means for removing said thermal transfer liquid from said tank, whereby said thermal transfer liquid is moved through said stacked array of containers, and at least one flexible conduit seal means surrounding said stacked array and connected between the interior sidewalls of said container and said stacked array of containers for diverting said thermal transfer liquid away from said sidewalls towards the interior of said stacked array of containers.

17. A TES tank system according to claim 16, further comprising a liquid level control means for controlling the height level of said liquid at approximately near and above said flexible conduit means.

18. A TES tank system according to claim 16, further comprising a liquid level control means for controlling the height level of said liquid in said tank.

19. A TES tank system according to claim 16, further comprising pressure release means for venting air pressure forming below said flexible conduit means.

20. A TES tank system comprising a stacked array of containers occupying a central portion of said tank, means for supporting said stacked array of containers near the bottom of said tank, each of said containers having a PCM medium therein, means for introducing a thermal transfer liquid into said tank above said stacked array of containers, means for removing said thermal transfer liquid from said tank, whereby said thermal transfer liquid is moved through said stacked array of containers, and liquid level control means for controlling the height level of said liquid in said tank at approximately near the bottom of said stacked array of containers.

* * * * *